Dec. 17, 1963
R. B. KEENEY
3,114,479
CONTROL SYSTEMS
Filed Oct. 12, 1962
5 Sheets—Sheet 1
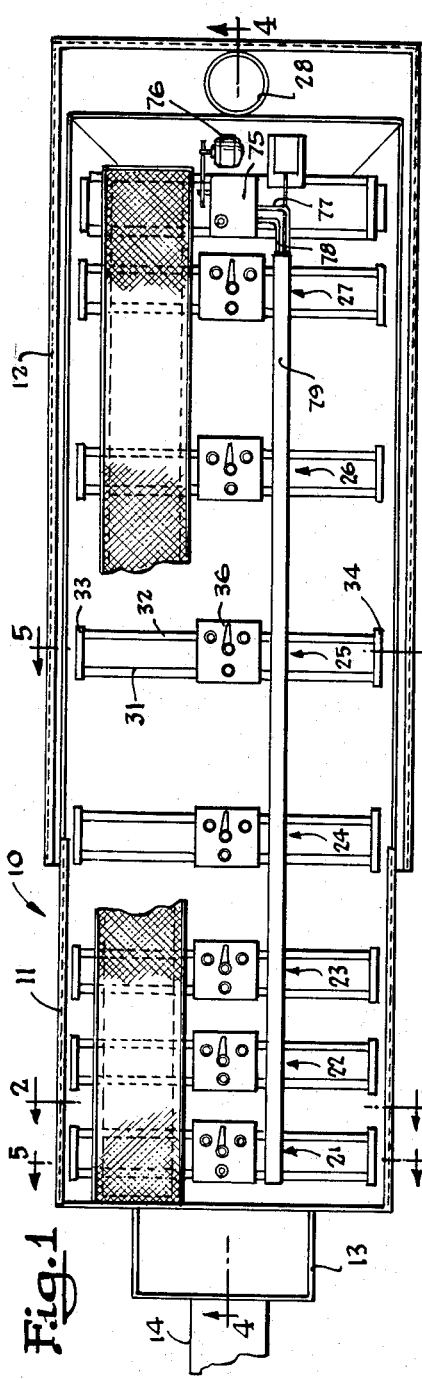
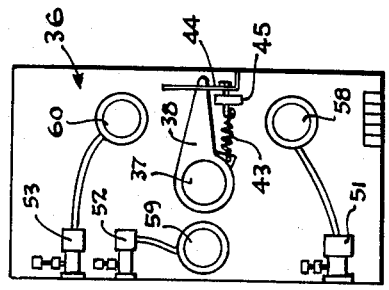
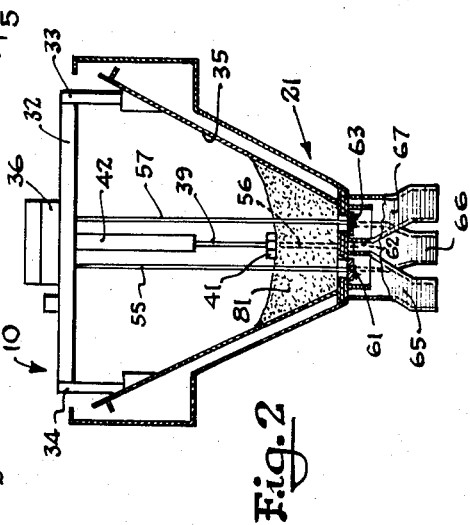
Inventor
Robert B. Keeney
By Wallace, Kinzer and Dorn
Attorneys Dec. 17, 1963     R. B. KEENEY     3,114,479
CONTROL SYSTEMS Filed Oct. 12, 1962     5 Sheets-Sheet 2

Inventor
Robert B. Keeney
By Wallace, Kinzer and Dorn
Attorneys

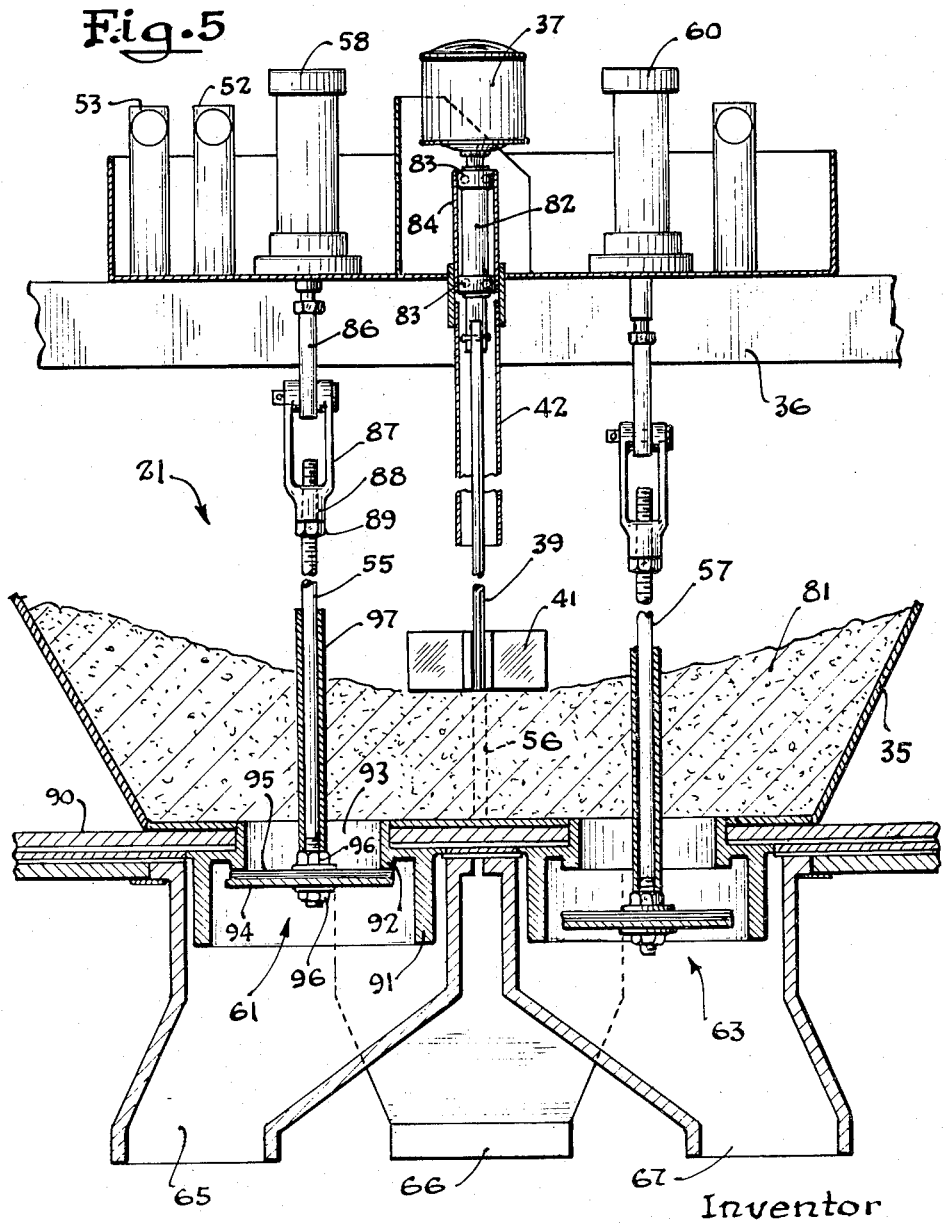

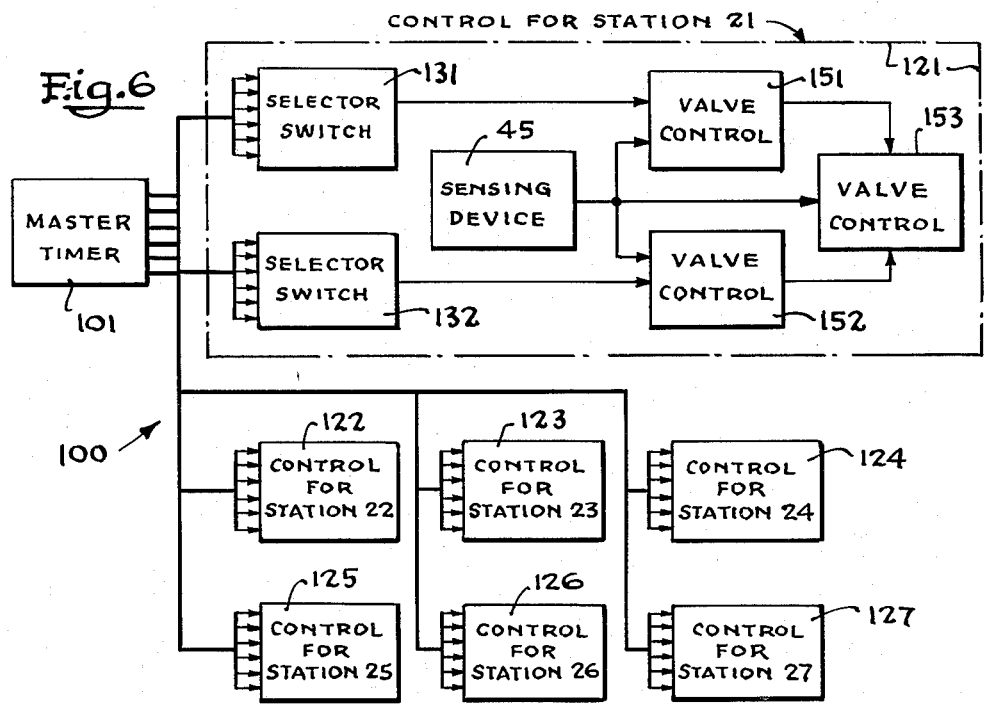

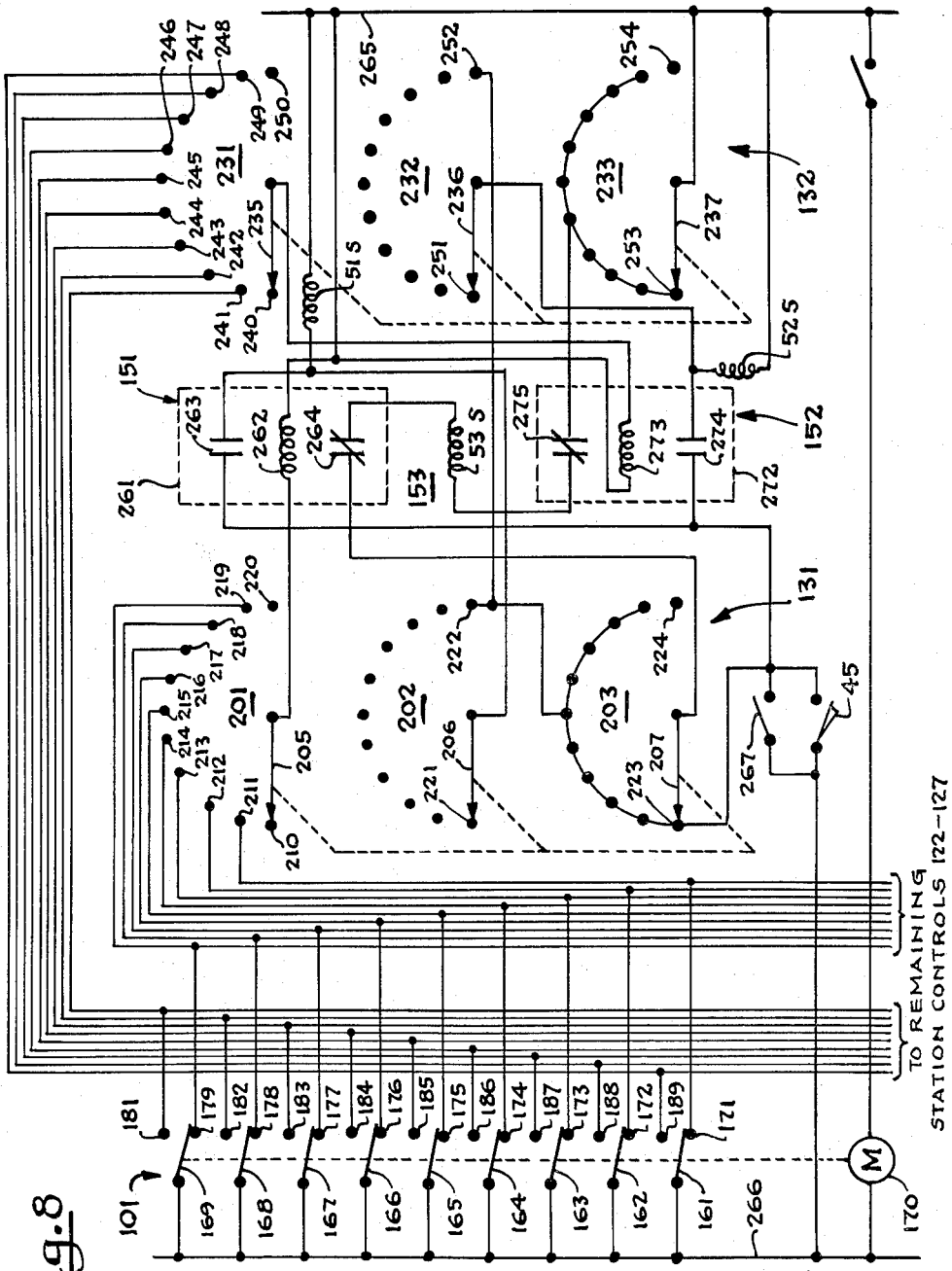

United States Patent Office 3,114,479
Patented Dec. 17, 1963

3,114,479
CONTROL SYSTEMS
Robert B. Keeney, Des Moines, Iowa, assignor to Eagle
Iron Works, Des Moines, Iowa, a corporation of Iowa
Filed Oct. 12, 1962, Ser. No. 230,049
6 Claims. (Cl. 222—64)

This invention relates to a new and improved control system for sand classifying apparatus and the like and more particularly to a new and improved time-division control system for a water scalping tank employed in the classification of sand or other granular material.

A typical water scalping tank utilized for classification of sand or other water-insoluble granular material comprises an elongated tank into which a slurry of sand and water is introduced. The sand and water mixture flows into one end of the tank and a water overflow occurs at the opposite end of the tank. The sand settles to the bottom of the tank, the larger sand particles settling near the feed end with progressively finer particles settling toward the overflow end of the tank. Sand outlets are located periodically along the bottom of the tank and are employed to discharge the various sizes of sand as they accumulate at the bottom of the tank. The sand is permitted to accumulate to a definite depth at each outlet. The various outlets at the bottom of the tank discharge different grades of sand and these are flumed away by one or more longitudinal flumes. By controlling the discharge from the outlet openings to the flumes, the gradation of sand in the flumes can be controlled to meet particular specifications.

The water scalping tank serves two basic functions. One is to remove excess water and thereby concentrate or thicken the sand. The second function is to segregate or classify sand into various sizes. These different sand sizes are then reblended in predetermined amounts to meet definite specifications. Surplus sand of various sizes may be stockpiled or diverted to waste. In some applications, two or more specification materials may be produced, using the same scalping tank. Ideally, the tank would separate the sand into a plurality of non-overlapping sizes. In actual practice, there is an overlapping of the several sand sizes but sufficient concentration of individual sizes is accomplished to enable the control of classification within the desired specifications.

To control the composition of a given specification sand, the amounts of sand discharged from the various outlet openings in the bottom of the scalping tank must be regulated relative to each other. This control may take the form of mechanically operated splitter gates or the like which are adjusted to afford the desired composition in the specification sand. However, if the composition of the input sand or slurry changes substantially, it may be necessary to change the setting of the control devices rather frequently in order to keep the specification material within the required limits. With conventional splitter gate controls, this is a time-consuming and, in many instances, quite wasteful operation.

A particular object of the invention is to provide a simple and economical electrical control for accurately splitting the outputs of the various discharge stations of a water scalping tank or similar classifying apparatus between two or more specification products.

Another object of the present invention is to control all of the discharge stations of a scalping tank or like classifying apparatus from a single master timer without sacrifice of flexibility of control of the individual discharge stations.

A further object of the invention is to formulate two or more specification sands, regardless of dissimilarities in the specifications, in a simultaneous manner, using a single water scalping tank or like classifying apparatus.

Other and further objects of the present invention will be apparent from the following description and claims and are illustrated in the accompanying drawings which, by way of illustration, show a preferred embodiment of the present invention and the principles thereof and what is now considered to be the best mode contemplated for applying these principles. Other embodiments of the invention embodying the same or equivalent principles may be made as desired by those skilled in the art without departing from the present invention and the purview of the appended claims.

In the drawings:

FIG. 1 is a plan view of a water scalping tank in which a control system constructed in accordance with one embodiment of the present invention is incorporated, a part of the tank structure being cut away to show internal construction;

FIG. 2 is a sectional elevation view taken approximately along line 2—2 in FIG. 1;

FIG. 3 is a detail plan view of a part of the control system for the water scalping tank of FIG. 1, but drawn to a somewhat larger scale;

FIG. 5 is a detail sectional elevation view taken approximately as indicated by line 5—5 in FIG. 1, but drawn to a substantially enlarged scale as compared with FIG. 1;

FIG. 6 is a block diagram of a control system for the scalping tank of FIGS. 1–5, constructed in accordance with one embodiment of the invention;

FIG. 7 is a timing chart for a master timing device incorporated in the control system of FIG. 6; and FIG. 8 is a detail schematic diagram of one form of electrical control apparatus for the system of FIG. 6.

Figure 4:
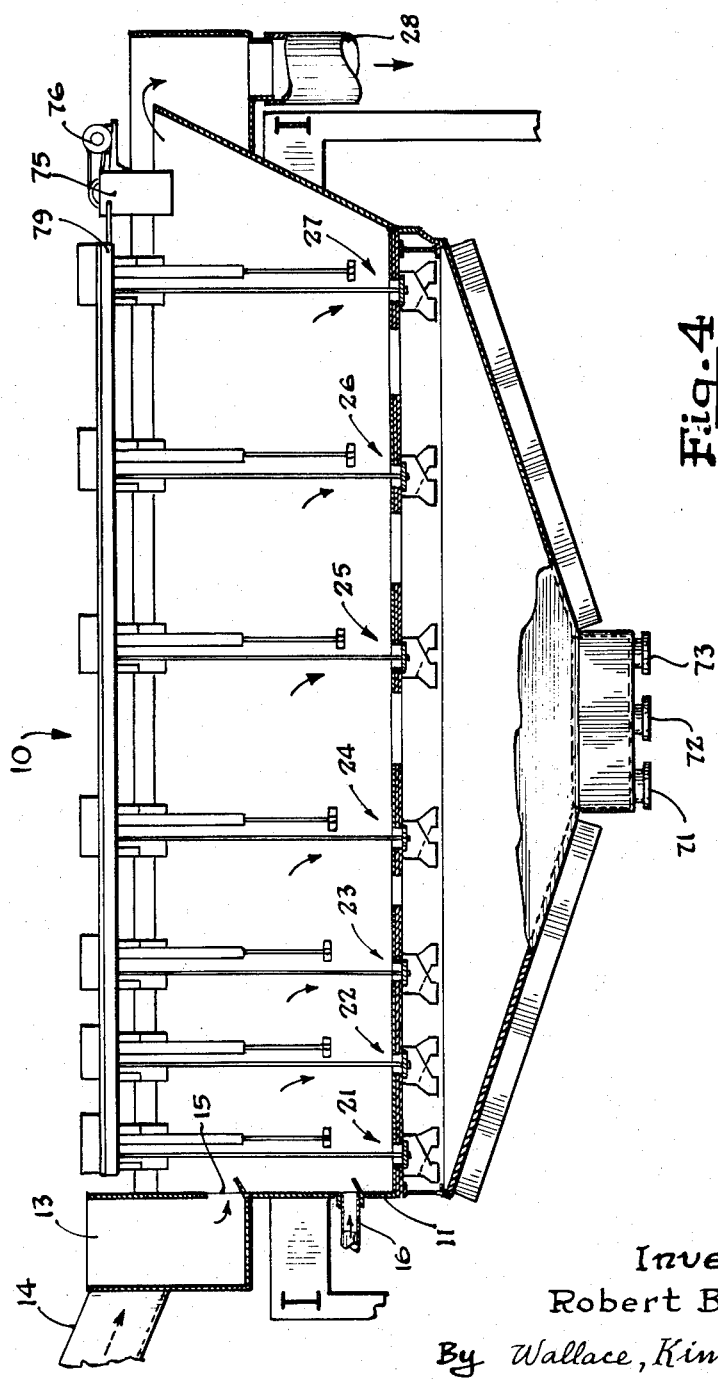
FIG. 4 is a longitudinal elevation view taken approximately along line 4—4 in FIG. 1.

FIGS. 1–4 illustrate the basic operating mechanism for a water scalping tank 10 that utilizes a control system constructed in accordance with the present invention. Scalping tank 10 includes a basic tank structure comprising an input or coarse sand section 11 and an output or fine sand section 12, these two tank sections being joined together to afford a complete tank structure. At the left-hand end of tank 10, as seen in FIGS. 1 and 4, there is located a feed box 13 to which an input conduit 14 is connected. Feed box 13 is provided with an outlet opening 15 affording access to the interior of the input tank section 11. An auxiliary water inlet 16 is located near the bottom of tank section 11 below feed box 13.

There are seven sand discharge or outlet stations in scalping tank 10, as best shown in FIGS. 1 and 4. These sand outlet stations are generally identified by the reference characters 21 through 27. Outlet station 21 is located nearest to the inlet or feed box 13 and discharge station 27 is located at the opposite or right-hand end of the tank. Thus, discharge station 27 is the closest to the overflow conduit 28 from which the water flows on discharge from the tank 10. The sands discharged at the stations 21 through 27 are progressively finer, due to the classifying operation of the scalping tank, as described in greater detail hereinafter.

FIGS. 2 and 3 illustrate the construction of one of the discharge stations, in this instance the initial discharge station 21. Since all of the sand outlets or discharge stations are substantially similar in construction, the apparatus illustrated in connection with station 21 may be considered to be typical of all of the sand outlet stations.

As shown in FIGS. 1–3, discharge station 21 comprises an upper frame including two transverse frame members 31 and 32 supported upon end posts 33 and 34 that are suitably mounted upon an internal section 35 of the tank 10. A mounting plate 36 bridges the central portion of frame 31–34. This mounting plate affords a support for a paddle motor 37 having a switch arm 38 connected thereto. The motor shaft is connected to a depending paddle rod 39 that carries a paddle member 41 located near the bottom of the tank, as shown in FIG. 2. The upper portion of paddle rod 39 may be encompassed in a guard 42 to protect the operating mechanism of the paddle and the motor 37 against contact with the water flowing through the tank. Switch arm 38 (FIG. 3) is maintained in an initial or unactuated position by suitable means such as a spring 43 that is connected from the switch arm to a bracket 44 mounted upon the plate 36. Rotation of switch arm 38, however, as described hereinafter, can be effected to bring the switch arm into contact with a sensing switch 45 that is also mounted upon the plate 36.

Mounting plate 36 also carries three solenoid controlled, hydraulically actuated valves 51, 52 and 53. Valves 51, 52 and 53 are connected by suitable conduits to three valve operating cylinders 58, 59 and 60, respectively. The cylinders 58, 59 and 60 are mechanically connected to three valve rods 55, 56 and 57 respectively (FIG. 2). The rods 55, 56 and 57 are employed to control and actuate three outlet valves 61, 62 and 63 respectively. The outlet valves themselves are quite simple in construction, the preferred construction of the valves being described in greater detail in connection with FIG. 5. With respect to the basic mechanism of FIGS. 1–3, it is sufficient to indicate that valves 61–63 are opened and closed by vertical movement of the corresponding valve rods 55–57.

Valves 61, 62 and 63 open into three individual sand discharge conduits or flumes 65, 66 and 67 respectively. Flumes 65–67 extend for the entire length of scalping tank 10 and are individually connected to three sand mixture outlets 71, 72 and 73 respectively. Each of the sand mixture outlets 71–73 may be connected to a dewatering screw to remove excess moisture, from which the sand is discharged to a conveyor apparatus for transportation to a given discharge location or stock pile, depending upon the requirements of the installation in which scalping tank 10 is employed. Since apparatus of this kind is conventional, it has not been illustrated in the drawings.

As noted hereinabove, the individual valve actuators 51, 52 and 53 are hydraulic devices that are solenoid controlled. The hydraulic supply for the valve actuators comprises a pump assembly 75 (FIG. 1) driven by an electrical motor 76. Pump assembly 75 may include the usual reservoir and suitable cut-off and bleeder valves. The pump is connected to valves 51, 52 and 53 by a pressure conduit or output line 77 and by a return line 78. The one pump 75 is used to operate all of the valve actuators, at the individual discharge stations 21–27 and, accordingly, is connected to each discharge station through a main control conduit housing 79. The conduit housing 79 may also carry suitable electrical connections for the solenoids utilized to operate the valve actuators at each of the stations.

The basic operation of scalping tank 10 proceeds as follows. A mixture of sand and water is fed into feed box 13, through conduit 14, (FIGS. 1 and 4) and into the scalping tank. At the same time, an auxiliary flow of water may be supplied to the tank through conduit 16. As the sand mixture flows out of opening 15, the heavier particles tend to settle almost immediately in the neighborhood of outlet station 21. Finer particles settle, progressively, in the areas adjacent sand outlets 22–27. With the inflow of sand mixture and water properly adjusted, by adjustment of the input through conduit 16, virtually all of the sand settles by the time the water reaches the end of the tank, and the overflow of water into the run-off conduit 28 is relatively clear and free of sand.

When the tank is placed in operation, all of the paddle motors such as motor 37 (FIG. 3) are energized. These motors rotate the paddles relatively freely in the water. In each instance, switch arm 38, which is mounted on the motor housing, is held out of contact with sensing switch 45 by spring 43. In this position of arm 38, switch 45 is open. With all of these switches open, all of the valves controlling the outlets of stations 21–27 are held closed and a buildup of sand is initiated in the bottom of scalping tank 10.

With particular reference to discharge station 21, as illustrated in FIG. 2, the sand 81 eventually accumulates to a level where it interferes with rotation of paddle 41. When this happens, the stator of motor 37 tends to rotate about its shaft, due to the magnetic reaction of the armature. The motor turns, against the spring 43, and pivots arm 38 into engagement with the sensing switch 45. As a consequence, one, two, or three of the valve operating cylinders 58–60 are actuated by the solenoid operated control valves 51, 52 and 53 respectively. Consequently, the related discharge valve or valves of the group 61–63 are opened, releasing sand into one or more of flumes 65–67.

The discharge of sand into the flumes reduces the level within the scalping tank, in the area adjacent to discharge station 21, and eventually frees paddle 41 for continued rotation. As soon as paddle 41 is able to rotate freely, spring 43 operates to turn motor 37 and switch arm 38 again out of engagement with the sensing switch 45. This is effective to actuate the solenoid controlled valves 51–53 and thereby causes the hydraulic valve lifters 58–60 to close the sand outlet valves. This process continues throughout operation of scalping tank 10, the control system of the present invention affording selective control of the valves to provide for the accumulation of sand of given constituency in flumes 65–67 as described in greater detail hereinafter in connection with FIGS. 5–8. Of course, this mode of operation requires the use of motors capable of sustained periods of stalled operation without overheating.

FIG. 5 illustrates in substantial detail the mechanical construction for sand discharge station 21. As shown therein, paddle motor 37 is connected to a spindle assembly 82 supported by suitable thrust bearings, such as the ball bearings 83, in a sleeve 84 that is mounted upon mounting plate 36. Sleeve 84 comprises an upward extension of the depending paddle rod guard 42. The lower end of spindle assembly 82 is connected to paddle rod 39 by suitable means, a pin connection being shown.

Also as shown in FIG. 5, the piston rod 86 for the valve operating cylinder 58 carries, at its lower end, a yoke 87. The lower end of yoke 87 comprises a threaded collar 88 into which the upper end of valve rod 55 is threaded. A suitable lock nut 89 is utilized to maintain rod 55 in fixed position within the collar portion 88 of the yoke once the desired adjustment of the length of the rod has been achieved. The resulting connection between cylinder rod 86 and valve rod 55 provides for convenient and effective adjustment of the length of the valve rod to assure effective closing of the valve. It also permits some minor misalignment between operating cylinder 58 and valve 61, reducing the critical nature of mounting of the valve operating device 58 with respect to the valve itself.

The structure of valve 61, in the illustrated embodiment, includes a valve guide and seat member 91 that is fixedly mounted on the bottom 90 of the tank. The valve guide and seat includes a re-entrant flange portion 92 that affords the actual valve seat. This flange 92 encompasses a relatively large central opening 93 in the casting comprising member 91. The lower end of valve rod 55 carries a valve disc 94, the valve disc having a seal member 95 mounted upon the upper surface thereof in position to engage the seating flange 92 of member 91.

The mounting of valve disc 94 on rod 55 entails the use of a threaded lower end on the valve rod, which extends through the valve disc, suitable nuts 96 being used to complete the mounting. Preferably, a protective sleeve 97 encompasses a portion of valve rod 55 above the valve disc to protect it against abrasion from sand 81.

FIG. 6 is a block diagram of a control system 100 for scalping tank 10, control system 100 being constructed in accordance with a preferred embodiment of the present invention. Control system 100 includes a master timer 101 that is electrically connected to individual control units 121 through 127 utilized to control the operation of discharge stations 21 through 27 respectively. Control units 121 through 127 are all essentially similar in construction; accordingly, only unit 121 is illustrated in substantial detail with respect to the component devices included therein.

Control unit 121 includes a first selector switch 131 and a second selector switch 132, each of which is connected by a plurality of connecting lines to master timer 101. Selector switch 131 is in turn electrically connected to a first valve control circuit 151 that includes a control relay and the operating solenoid for valve actuator 51, as described more fully hereinafter in connection with FIG. 8. Selector switch 132 is connected to a second valve control circuit 152 that is similar in construction to circuit 151. Thus, valve control circuit 152 comprises, essentially, a control relay and the operating solenoid for valve actuator 52 of discharge station 21.

Each of valve control circuits 151 and 152 is connected to a sensing device 45 which corresponds to the switch 45 that determines when the sensing paddle 41 at the initial discharge station is blocked in its rotation, indicating the presence of sufficient sand permitting sand discharge from this station. Sensing device 45 is also connected to a third valve control circuit 153 that includes the operating solenoid for the third or waste discharge valve actuator 53 at the initial sand discharge station. The third valve control circuit 153 is also connected to each of the first and second valve control circuits 151 and 152.

Master timer 101, in the arrangement illustrated in FIG. 6, is provided with a series of individual output circuits that are energized for varying periods of time. For example, one of the output circuits from the master timer may be connected to a power supply for twenty percent of the operating cycle of the timer, another may be connected to the power supply for forty percent of the operating cycle, and so on. The individual output circuits of the master timer may be connected individually to valve control circuit 151, through selector switch 131. Thus, the selector switch can be adjusted to provide sand discharge through the initial discharge valve 61 at station 21 during a given portion of each operating cycle of the master timer.

The same arrangement is employed with selector switch 132. Thus, this selector switch is utilized, in conjunction with master timer 101, to connect valve control circuit 151 to a suitable power supply during a given percentage of each operating cycle of the master timer determined by the setting of the selector switch.

Of course, it is undesirable to open the discharge valves controlled by circuits 151 and 152 when the sand level at station 21 is so low that an excessive amount of water would be discharged upon opening of the valves. It is for this reason that sensing device 45 is connected to each of valve control circuits 151 and 152. The sensing device prevents opening of the discharge valves, under the control of circuits 151 and 152, except during those time intervals in which there is sufficient sand at station 21 to afford a discharge of the requisite character.

If selector switch 131 were set for discharge on the basis of a low duty cycle (e.g., 20%) and a similar setting were established for selector 132, an excessive amount of said might accumulate at control station 21 unless discharged to the waste flume through valve 63 (FIGS. 2, 4 and 5). The valve control circuit 153 controlling valve 63, accordingly, is connected to sensing device 45 to provide for actuation of the waste valve during intervals in which the sensing device indicates the presence of sand above the level of the paddle 41. The waste flume should not receive sand, however, during those portions of the operating cycle wherein sand is to be discharged through either of the two specification valves 61 and 62. Hence, additional connections are provided from circuit 153 to valve control circuits 151 and 152 to prevent actuation of valve control circuit 153 during those time intervals in which the two specification sand control circuits are operative to actuate their respective discharge valves.

FIG. 8 affords a detailed circuit diagram of control unit 121 for discharge station 21, together with a complete illustration of master timer 101 and the electrical connections between devices 101 and 121. As shown therein, master timer 101 may comprise a series of cam-actuated switches 161 through 169, all actuated in synchronism with each other by suitable means such as a motor 170. Each of switches 161 through 169 is a single-pole double-throw device. The lower set of output terminals for these switches are numbered, from bottom to top, with reference numerals 171 through 179. The upper group of output terminals for the master timer switches are numbered consecutively from top to bottom with reference numerals 181 through 189.

The master timer is shown at a particular operating position which may be considered to represent the normal position of the timer at the beginning of each operating cycle. For this condition of the master timer, switches 161 through 169 are closed on their lower contacts 171 through 179, respectively. All of switch contacts 181 through 189 are open-circuited.

In the circuit illustrated in FIG. 8, selector switch 131 is shown to include three separate but ganged switch sections 201, 202 and 203 having movable contacts 205, 206 and 207, respectively. Switch section 201 includes individual contacts 210 through 220. Switch section 202 is also provided with eleven individual contacts, but only the first and last contacts 221 and 222 are identified by reference numerals since all of the intervening contacts are open-circuited. Switch section 203, on the other hand, also includes eleven contacts. However, the first ten contacts, corresponding to contacts 201 through 219 of section 201, are all electrically connected to each other and may therefore be identified by a single reference numeral 223. The eleventh and final contact 224 of this switch section is open-circuited.

Selector switch 132 is also a three-stage device, including individual selector switch sections 231, 232 and 233. Switch sections 231, 232 and 233 are provided with individual movable contacts 235, 236 and 237, respectively, which are ganged for conjoint operation. Switch section 231 includes eleven fixed contacts 240 through 250. The eleven-contact switch segment 232 is open-circuited at most positions, only the initial and final contacts 251 and 252 being identified by individual reference numerals. The first ten contacts of switch section 233 are electrically connected to each other, so that only the initial contact 253 requires identification. The final contact 254 of this section of selector switch 132 is again open-circuited.

The initial valve control circuit 151 in FIG. 8 comprises a first valve control relay 261 having an operating coil 262, a pair of normally open contacts 263, and a pair of normally closed contacts 264. One terminal of operating coil 262 is connected to the movable contact 265 in the first section 201 of selector switch 231. The other terminal of the operating coil is connected directly to a power line 265. The operating solenoid 51S for the first outlet valve of the scalping tank is connected from the power line 265 to the normally open contacts 263 of relay 261 and from that point through sensing switch 45 to a second power line 266. Preferably, a test switch 267 is connected in parallel with sensing switch 45.

The second valve control circuit 152, in the form illustrated in FIG. 8, comprises a relay 272 having an operating coil 273, a pair of normally open contacts 274, and a pair of normally closed contacts 275. One terminal of operating coil 273 is connected directly to the power line 265 and the other terminal of this coil is connected to the movable contact 235 in the first stage 231 of selector switch 132. The operating solenoid 52S for the second discharge valve in the sand discharge station 21 of the scalping tank is connected from power line 265 through the normally open contacts 274 of relay 272 and through sensing switch 45 back to the other power line 266. In addition, solenoid 52S is connected to the movable contact 236 in the second stage of selector switch 232. A similar connection is provided from the first discharge solenoid 51S to the movable contact 206 in the second stage 202 of selector switch 131.

As indicated in the block diagram of FIG. 6, both of the valve control circuits 151 and 152 are connected to the circuit 153 used to control the third outlet valve in the initial discharge station of the scalping tank. In FIG. 8, this circuit arrangement is shown by the connections for the operating solenoid 53S that actuates the third or waste discharge valve. One terminal of solenoid 53S is connected through the normally closed contacts 264 of relay 261 to the movable contact 207 of switch section 203 in selector switch 131. A similar circuit connection is provided from the other terminal of solenoid 52S through the normally closed contacts 275 of the second control relay 272 to the fixed contacts of switch section 233 in selector switch 132. The movable contact 237 of this switch section is connected to power line 265. The first ten fixed contacts of switch section 203 in selector switch 131, on the other hand, are returned to power line 266 through sensing switch 45. A connection is provided from these fixed contacts in switch section 203 to the final contact 222 of switch section 202. The control circuit arrangement further includes an electrical connection between the contacts 222 and 252 in switch sections 202 and 232 of selector switches 131 and 132.

The main connections from master timer 101 to selector switches 131 and 132 are made at the initial stages 201 and 231 of the selector switches. Thus, contacts 211 through 219 in the initial section 210 of selector 131 are individually connected to master timer contacts 171 through 179 respectively. Master timer contacts 181 through 189, on the other hand, are individually connected to respective ones of contacts 241 through 249 in the initial stage 231 of selector switch 132. The initial terminals 210 and 240 of switch sections 201 and 231 are left open-circuited. Furthermore, terminals 220 and 250 in these two switch sections are also open-circuited.

The timing chart of FIG. 7 illustrates in graphic form the operation of master timer 101. The time scale in FIG. 7 may be arbitrarily selected with any given time units; preferably, however, the time units indicated are of the order of one second to a few seconds in duration. In the following discussion, it is assumed that each time interval represents one second, but this can be changed in practice if desired and is dependent solely upon the speed of rotation of motor 170.

As shown in FIG. 7, contact 171 is closed for a time interval of one unit and is open for the remainder of the operating cycle of master timer 101. Thus, contact 171 affords a connection for a ten percent duty cycle. Conversely, contact 189 is closed for ninety percent of the operating cycle of the master timer and is opened for a ten percent interval during which contact 171 is effectively closed. Contacts 172, 173, 174, 175, 176, 177, 178 and 179 are closed for periods corresponding to twenty, thirty, forty, fifty, sixty, seventy, eighty and ninety percent, respectively, of the master timer operating cycle. The inverse percentage arrangement is obtained with respect to contacts 182 through 189.

In considering operation of the circuit of FIG. 8, it may be assumed, by way of example, that selector switch 131 is set to engage the movable contacts of the several selector switch sections with the third fixed contact in each section. Thus, movable contact 205 is engaged with contact 212. Similarly, selector switch 132 may be set to the fifth level of operation, engaging contact 235 in switch section 231 with fixed contact 244.

At the outset, therefore, an operating circuit is established from power line 266 through master timer contacts 162 and 172 to selector switch contacts 212 and 205. From selector switch contact 205 the circuit is completed through operating coil 262 of relay 261 to the second power line 265. It is thus seen that relay 261 is energized, closing contacts 263 and opening contacts 264. This establishes an operating circuit for discharge valve solenoid 51S, the circuit extending from power line 265 through the solenoid and through relay contacts 263 and sensing switch 45 to power line 266. Solenoid 51S accordingly is energized, whenever there is sufficient sand at the initial discharge station of the scalping tank to close sensing switch 45. As long as master timer contacts 162 and 172 remain closed, sand accumulating at the first outlet station is discharged through the initial outlet valve 61.

As noted hereinabove, master timer contacts 162 and 172 remain closed only during the first two time units of the operating cycle for master timer 101 (see FIG. 7). During this period, with contacts 263 of relay 261 closed, solenoid 51S is energized whenever sensing switch 45 is closed by accumulated sand. At the same time, contacts 264 of relay 261 are open, so that the solenoid 53S controlling the waste discharge valve cannot be energized and no sand is discharged to the waste flume of the tank. Moreover, the control relay 272 for the second valve control circuit 152 is not actuated so that contacts 274 remain open and solenoid 52S is not energized.

After the first two time units in the initial operating cycle of master timer 101 have transpired, timer contacts 162 and 172 are opened, interrupting the energizing circuit for operating coil 262 of relay 261. Accordingly, relay contacts 263 open, de-energizing solenoid 51S. At the same time, contacts 264 close, affording an energizing circuit for solenoid 53S that begins at power line 265 and extends through switch section 233 and the normally closed contacts 275 of relay 272 to the solenoid; from the solenoid, this circuit continues through contacts 264, switch section 203, and sensing switch 45 to the other power line 266. Thus, sand accumulated at the first discharge station of the scalping tank is now discharged to the waste flume.

The sand from the initial outlet station 21 of the scalping tank is discharged to the waste flume until the sixth time unit in the operating cycle of the master timer is completed. At this point, as shown in FIG. 7, contacts 166 and 184 are closed in master timer 101. Closing of these contacts completes an operating circuit from power line 266 through the master timer to contact 244 of selector switch section 231. This circuit continues through the selector switch contact 235 to the operating coil 273 of relay 272 and from the operating coil to power line 265. It is thus seen that control relay 272 in the second valve control circuit 152 of unit 121 is energized, opening contacts 275 and closing contacts 274.

As soon as contacts 275 open, the operating circuit for solenoid 53S is broken, with the result that discharge to the waste flume through valve 63 is interrupted. Closing of contacts 274, on the other hand, completes an operating circuit for solenoid 52S, this operating circuit extending from power line 265 through contacts 274 to sensing switch 45 and thence to the other power line 266. Master timer contacts 166 and 184 remain closed until the end of the master opearting cycle is reached. During this time interval, accordingly, each time sensing switch 45 closes the sand that has accumulated at station 21 is discharged through valve 62 to the second specification flume of the tank.

Operation of the system as described above continues as long as the settings for selector switches 131 and 132 remain unchanged. Twenty percent of the sand collected at discharge station 21 is supplied to the first specification flume of the scalping tank, since solenoid 51S is energized each time switch 45 closes during twenty percent of each operating cycle for master timer 101. Forty percent of the sand that accumulates at station 21 is discharged to the second specification flume, since solenoid 52S is energized by closing of switch 45 during the last forty percent of each operating cycle of master timer. The remaining forty percent of the time the two specification valve solenoids 51S and 52S are open-circuited but the waste valve solenoid 53S is actuated each time switch 45 closes.

If it is desired to increase the quantity of sand from discharge station 21 in the first specification product, selector switch 131 is advanced to a higher percentage setting. By the same token, the quantity of sand supplied to the first specification flume can be reduced to ten percent by setting switch 131 to engage contact 205 with contact 211 in the initial section 201 of the selector switch. Further, selector switch 131 may be set to the initial or zero position with contact 205 engaging contact 210 in the first section 201 of the switch. If this is done, relay 261 cannot be energized and none of the sand from station 21 is supplied to the first specification flume of the tank.

The same operating conditions apply to the control of the second specification sand by selector switch 132. Thus, if a greater percentage of sand from station 21 is desired in this product, switch 132 is advanced to a higher setting. If less of the coarse sand from station 21 is required, the selector switch is moved to a lower setting. Again, all sand from station 21 can be eliminated, in the second product, by moving switch 132 to the illustrated zero position, since this effectively open-circuits the control relay 272 normally used to actuate valve solenoid 52S.

In all of the first ten settings of selector switches 131 and 132, solenoid 53S is energized during any time interval in which the other valve solenoids 51S and 52S are not energized, provided sensing switch 45 closes. If both selector switches are set to the initial or zero position as illustrated in FIG. 8, all of the sand from station 21 is discharged to waste, since both control relays 261 and 272 are effectively de-energized and solenoid 53S is maintained in an operating circuit between the two power lines and in series with sensing switch 45.

On the other hand, if either of the selector switches is set to its final operating position, diametrically opposite that illustrated, waste valve solenoid 53S is effectively disconnected from the operating circuit. Thus, solenoid 53S may be open-circuited at either of contacts 224 and 254 in the selector switches. This setting of either selector switch, however, connects one of the two specification solenoids 51S and 52S to sensing switch 45, in an operative circuit arrangement that causes the valve solenoid to be energized whenever the sensing switch closes, independently of actuation of either of relays 261 and 272. With switch 131 set to its maximum position, solenoid 51S is connected in an operating circuit that begins at power line 265 and extends through the solenoid to the movable contact 206 of switch section 202. But contact 206 is engaged with contact 222, so that a complete circuit is established to sensing switch 45 and to power line 266. Similarly, when selector 132 is in its maximum position, solenoid 52S is connected in an operating circuit through the second stage 232 of selector switch 132 and through sensing switch 45 to the two power lines. In effect, therefore, the final positions for the two selector switches may be utilized to connect the respective operating solenoids in continuous operating circuits independent of master timer 101.

The maximum or hundred percent settings for the two selectors for valve solenoids 51S and 52S are provided because in some applications the product accumulated at any given outlet station in the scalping tank may be fed entirely to one or the other of the specification products. That is, it sometimes happens that all of the sand from a given discharge station is routed to only one product. The maximum settings of the selector switches make it possible to achieve this mode of operation without the necessity of continuously energizing the associated control relays, thereby increasing the electrical and mechanical life of these components.

From the foregoing description, it will be apparent that it is possible to set selector switches 131 and 132 to settings which would apparently exceed a total of one hundred percent of the operating cycle for master timer 101. The selector switches can be mechanically interlocked to prevent operation in this manner, but this is not usually considered to be necessary. If the selector switches are set for percentage discharges exceeding one hundred percent, there is no interference with continued operation of the system and no damage to the equipment; instead, only a change in the calibration effect of the selector switches takes place.

Indeed, proper manipulation of percentage settings exceeding a total of one hundred percent can afford an even finer operating control than achieved in the example given above. Thus, by way of example, selector switch 131 may be set to its eighth operating position with movable contact 205 engaging fixed contact 217 in the first section of selector switch. This, of course, would ordinarily afford a seventy percent setting for the control of the first valve solenoid 51S. At the same time, the second product selectors, switch 132, may be set for a forty percent duty cycle. The net result, with these settings, obviously cannot be a total of one hundred and ten percent of the discharge station capacity, since it is impossible to discharge more sand than actually accumulates. Instead, the net actual result is the discharge of sixty-five percent of the sand accumulating at station 21 into the initial product under the control of solenoid 51S and the discharge of thirty-five percent of the sand from this station to the second product under the control of solenoid 52S.

To explain more fully, with a seventy percent setting for selector switch 131 and a forty percent setting for selector switch 132, both of the valve solenoids 51S and 52S are closed during the seventh time unit of operation of master timer 101, since at this time master timer contacts 177 and 184 are both closed (see FIG. 7). Consequently, during a total time interval of ten percent of the operating cycle of the master timer, both valves are opened whenever the sensing switch 45 is actuated. During these time intervals in which both first and second product valves are opened, approximately half of the sand discharged goes to each of the products. This produces the aforementioned 65–35 split between the two products with the selectors set for seventy and forty percent, respectively.

As noted above, a test switch 267 is connected in parallel with sensing switch 45. The manually operable test switch is utilized to actuate the valve solenoids independently of the sensing switch whenever it is necessary or desirable to empty the scalping tank, as for periodic inspections or like purposes.

The system of the invention affords an accurately calibrated splitting action with respect to sand accumulated at each of the discharge stations 21–27 of scalping tank 10. The control system for station 21 is duplicated for each of the remaining discharge stations of the scalping tank so that the percentage distribution of the sand from each station may be varied to meet the requirements of the specifications for the two products being prepared. All of the control units 121–127 are actuated from the single master timer 101 so that there is no need to coordinate the operation of a plurality of individual timers.

Hence, while preferred embodiments of the invention have been described and illustrated, it is to be understood that they are capable of variation and modification, and I therefore do not wish to be limited to the precise details set forth, but desire to avail myself of such changes and alterations as fall within the purview of the following claims.

I claim:

1. A control system for a water scalping tank, or like classifying apparatus for granular material, having a series of outlet stations each including first and second outlet valves, said control system comprising:
   a master timer including a plurality of timing elements and means for cyclically actuating said timing elements between actuated and unactuated conditions for periods of individually different duration within a given operating cycle;
   a series of control units, one for each outlet station, each control unit including a selector device connected to said timing elements and operable, independently of the selector devices in the remaining control units, to select any one of said timing elements;
   and valve actuator means for each of said outlet valves, connected to said control units to open and close said outlet valves at each station in timed relation according to a duty cycle determined by the actuation of the timing element selected by the setting of the selector device in the control unit for that station.

2. A control system for a water scalping tank, or like classifying apparatus for granular material, having a series of outlet stations each including first and second outlet valves, said control system comprising:
   a master timer including a plurality of timing switches and means for cyclically actuating said timing switches between open and closed conditions for periods of individually different duration within a given operating cycle;
   a series of control units, one for each outlet station, each control unit including a selector switch connected to said timing switches and operable, independently of the selector devices in the remaining control units, to select any one of said timing switches;
   and electrically operable valve actuator means for each of said outlet valves, connected to said control units to open and close said outlet valves at each station in timed relation according to a duty cycle determined by the actuation of the timing switch selected by the setting of the selector switch in the control unit for that station.

3. A control system for a water scalping tank, or like classifying apparatus for granular material, having a series of outlet stations each including first and second outlet valves, said control system comprising:
   a master timer including two sets of timing elements and means for cyclically actuating said timing elements between actuated and unactuated conditions for periods of individually different duration within a given operating cycle;
   a series of control units, one for each outlet station, each control unit including two selector devices each connected to one set of said timing elements and operable, independently of each other and of the selector devices in the remaining control units, to select any one of said timing elements in the set connected thereto;
   and a plurality of valve actuator means, one for each of said outlet valves, each valve actuator means being connected to one selector device in one of said control units for opening and closing said outlet valves at each station in timed relation, each in accordance with a duty cycle determined by the setting of the selector device in the control unit for that station.

4. A control system for a water scalping tank, or like classifying apparatus for granular material, having a a series of outlet stations each including first and second product outlet valves, and a waste outlet valve, said control system comprising:
   master timing switch means including two sets of timing switch contacts and means for cyclically connecting said timing switch contacts to a power supply for periods of individually different duration within a given operating cycle;
   a series of control units, one for each outlet station, each control unit including a pair of selector switches each connected to one set of said timing switch contacts and operable, independently of each other and of the selector switches in the remaining control units, to select any one of said timing switch contacts in the set connected thereto;
   a plurality of product valve actuator means, one for each of said product outlet valves, individually connected to said selector switches to open and close said product outlet valves at each station in timed relation according to duty cycles determined by the setting of the selector switch in the control unit for that station;
   and a series of waste valve actuators, one for each of said waste outlet valves and each connected to both of said product valve actuator means for one of said control units, for opening the waste outlet valve at each station during time intervals when the product outlet valves at that station are closed.

5. A control system for a water scalping tank, or like classifying apparatus for granular material, having a series of outlet stations each including first and second product outlet valves, and a waste outlet device, said control system comprising:
   master timing switch means including two sets of timing switch contacts and means for cyclically connecting said timing switch contacts to a power supply for periods of individually different duration within a given operating cycle;
   a series of control units, one for each outlet station, each control unit including a pair of selector switches each connected to one set of said timing switch contacts and operable, independently of each other and of the selector switches in the remaining control units, to complete an electrical connection from a selector contact to any one of a set of fixed contacts including one fixed contact connected to each of said timing switch contacts in the set connected thereto and at least one open-circuited fixed contact;
   a plurality of product valve actuator devices, one for each of said product outlet valves, each comprising a solenoid and a relay individually connected to said one of the selector contacts of selector switches, for opening and closing said product outlet valves at each station in timed relation according to predetermined duty cycles of 0 to 100 percent determined by the setting of the selector switch in the control unit for that station;
   a series of waste valve actuator solenoids, one for each of said waste outlet valves and each connected to both of said product valve actuator relays for one of said control units, for opening the waste outlet valve at each station during time intervals when the product outlet valves at that station are closed;
   and a series of sensing devices, one for each station and connected to all of said solenoids for that station, for limiting actuation of said valves to time intervals when granular material is present in at least a predetermined quantity at said station.

6. A control system for a water scalping tank, or like classifying apparatus for granular material, having a series of outlet stations each including first and second product outlet valves, and a waste outlet valve, said control system comprising:

master timing switch means including a set of cam-actuated motor-driven single-pole double-throw timing switches affording two sets of timing switch contacts cyclically connected to a power supply for periods of individually different duration within a fixed operating cycle;

a series of control units, one for each outlet station, each control unit including a pair of selector devices each connected to one set of said timing switch contacts and operable, independently of each other and of the selector devices in the remaining control units, to select any one of said timing switch contacts in the set connected thereto;

a plurality of product valve actuator means, one for each of said product outlet valves, individually connected to said selector devices to open and close said product outlet valves at each station in timed relation according to duty cycles determined by the setting of the selector devices in the control unit for that station;

a series of waste valve actuators, one for each of said waste outlet valves and each connected to both of said product valve actuator means for one of said control units, for opening the waste outlet valve at each station during time intervals when the product outlet valves at that station are closed;

and means for preventing opening of said outlet valves unless granular material is present above a predetermined level.

No references cited.